United States Patent [19]

Nouwens

[11] Patent Number: 5,029,409
[45] Date of Patent: Jul. 9, 1991

[54] FISHING LINE LOADING DEVICE

[76] Inventor: Jean P. Nouwens, 2339 Ogilvie Road, Gloucester, Canada, K1J 8M6

[21] Appl. No.: 536,316

[22] Filed: Jun. 11, 1990

[51] Int. Cl.⁵ ............................................. A01K 87/00
[52] U.S. Cl. ................................. 43/25; 242/156.1; 242/129.8; 242/106; 43/4
[58] Field of Search .................. 43/4, 25, 25.2; 242/106, 129.8, 156.1

[56] References Cited

U.S. PATENT DOCUMENTS

| | | | |
|---|---|---|---|
| 577,258 | 2/1897 | Innes | 242/156.1 |
| 1,398,347 | 11/1921 | Stott | 242/156.1 |
| 2,993,661 | 7/1961 | D'Arrigo | 242/106 |
| 3,402,501 | 9/1968 | Davis | 242/129.8 |
| 3,595,497 | 7/1971 | Boatright | 242/156.1 X |
| 3,776,485 | 12/1973 | Foley et al. | 43/25 X |
| 3,950,881 | 4/1976 | Hays | 43/25 |
| 3,951,354 | 4/1976 | Bagby | 242/129.8 |
| 4,922,644 | 5/1990 | Sherbondy | 43/25 |

Primary Examiner—Richard K. Seidel
Assistant Examiner—Patty E. Hong

[57] ABSTRACT

A fishing line loading device comprises a frame and a movable axle pin by which a fishing line supply spool may be mounted. A tension and guide plate is attached to the frame and, being spring-loaded, it automatically applies the proper tension to the circumferential edges of the spool. Also, being grooved, it eliminates horizontal movement of any size of supply spool. The frame may be mounted on a fishing rod near the reel, thereby holding the supply spool centered on the rod for line transfer.

4 Claims, 5 Drawing Sheets

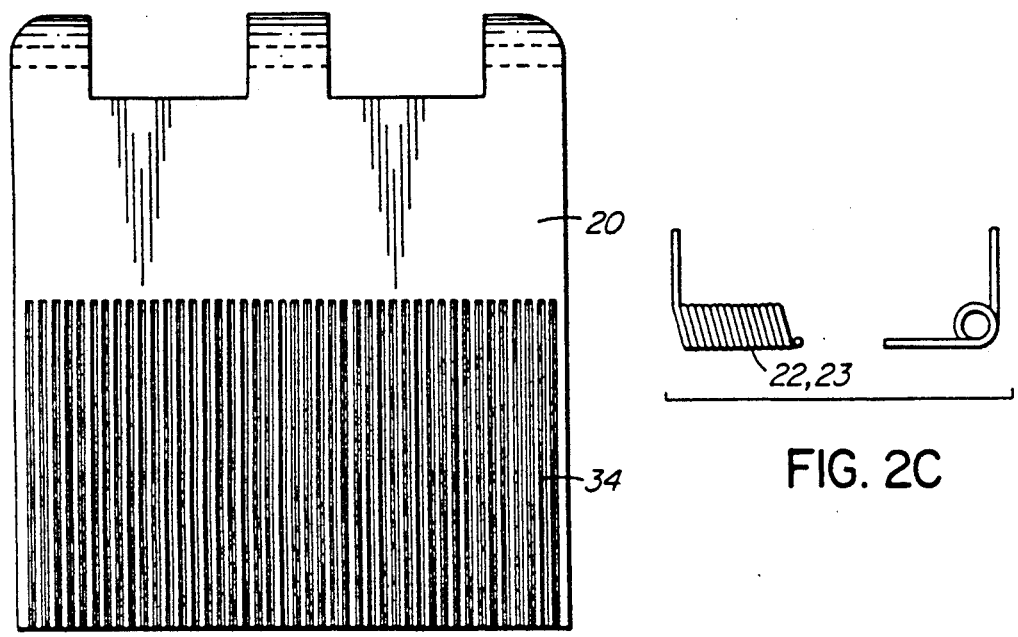
FIG. 2A
FIG. 2C
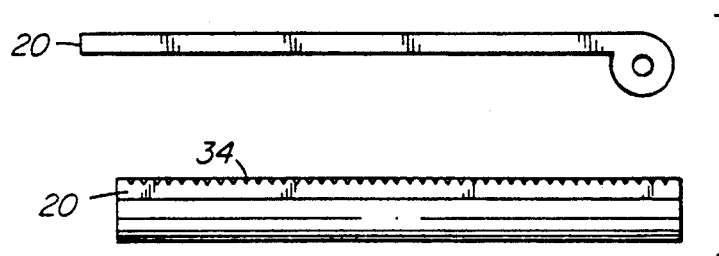
FIG. 2B
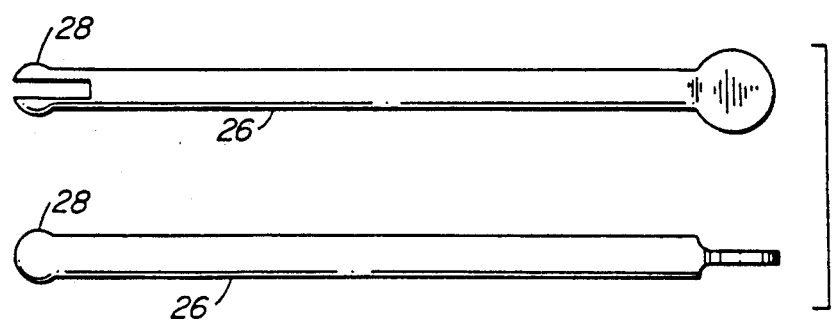
FIG. 2D

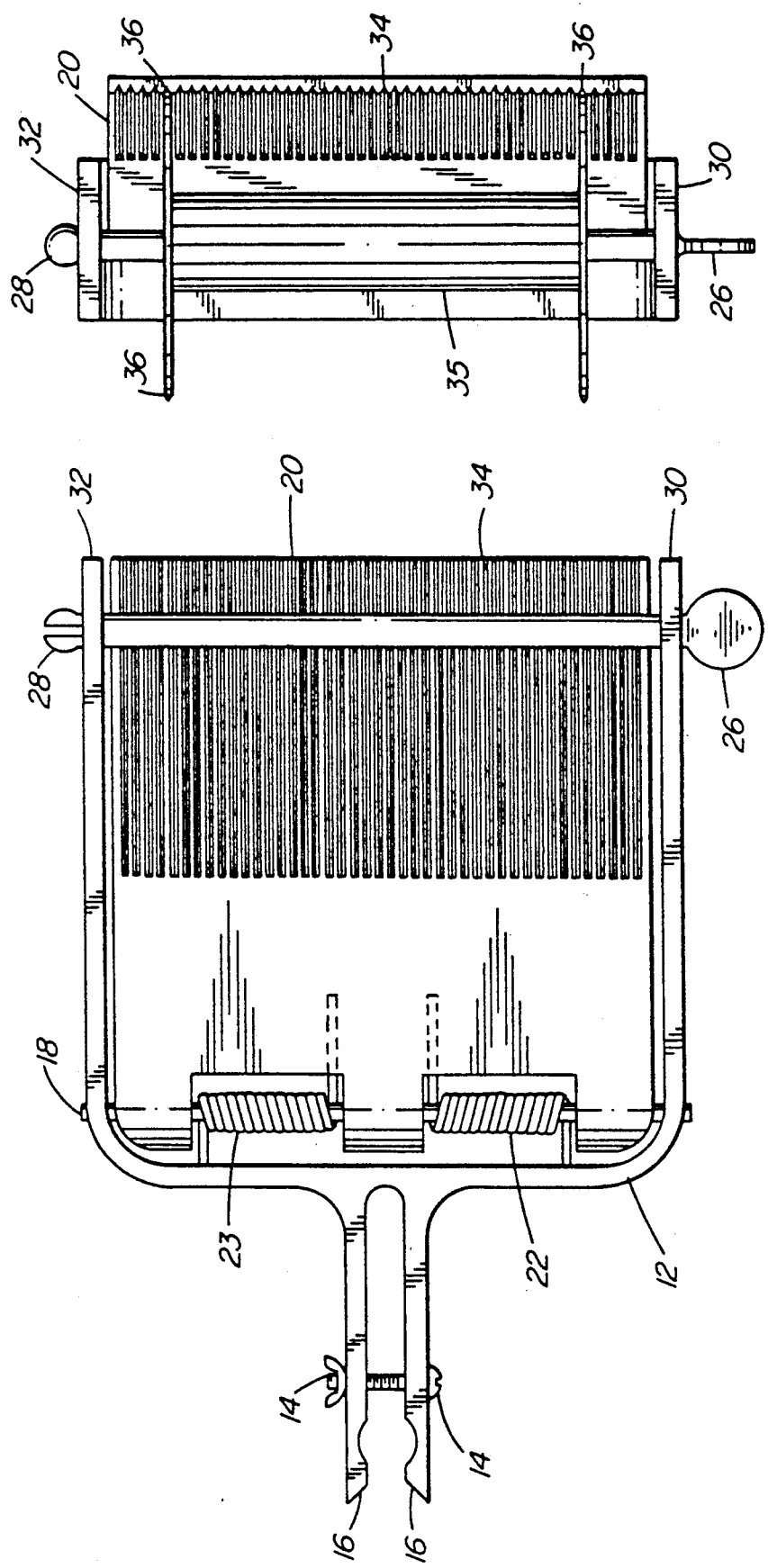

FISHING LINE LOADING DEVICE

BACKGROUND OF THE INVENTION

When new fishing line is purchased, it must be transferred from the supply spool to the fishing reel. It is now customary to mount the supply spool on an axle and hold it with one hand as the reel is wound with the other. During this procedure sufficient pressure must be applied to the spool to ensure proper tension on the line being loaded. Doing this manually causes inconsistent tension and spool over-run or line kinking can occur.

If line kinking occurs, the process of transfer must stop and the line straightened. If the line is completely entangled, the line must be cut free of the spool and discarded.

Efforts have been made in the past to produce rereeling devices, but these known devices are impractical to use and are restricted to certain widths of supply spool or design of fishing rod. The other devices have axle pin designs which are made for one particular width of supply spool and are not easily adaptable to any variance in either supply spool width or diameter. Other designs use a manually adjustable brake for tension control, but the braking force is applied laterally and such devices are prone to operator error in applying too much or not enough resistance to movement to the supply spool. This causes the line to be loaded on the reel too tightly, or is prone to the spool over-running, often causing line entanglement. These other known designs are often of multiple pieces which are removable and can easily be lost or are overly complicated resulting in high manufacturing costs.

Fishing line is commonly sold in a package which contains a length of fishing line on a supply spool. These supply spools are not subject to industry standards. Therefore, there is a wide variety of spool sizes, both in height and width available to the public. These varying sizes need a loading device that can compensate for such differences without extensive modification or assembly and still provide the proper amount of loading tension.

It is therefore an object of this invention to provide a fishing line loading device in a form which is economical and effective to use.

The fishing line loading device of the present invention in one form provides a means of transferring fishing line from a supply spool to a fishing reel while attached to a fishing rod. The invention provides a means of line transfer from a supply spool to a fishing reel with sufficient tension so that the line being transferred will not be stretched or be wound too loosely causing line kinking or entanglement.

Another object of the invention is to provide a design with which any common sized supply spool of varying diameter or width can be used. A further object of the invention is to provide a device with a minimum of removable parts and manual adjustments to enable the mounting and use of said device with one hand for the physically challenged.

SUMMARY OF THE INVENTION

The fishing line loading device embodied in the present invention includes a U shaped frame with two fixed upright arms fastened to a transverse base, each of the respective arms having two aligned holes through them. The pair of holes closest to the base of the frame are used to support a tension plate pin preferably of stainless steel, which in turn holds a tension and guide plate means and spring means in place. The second pair of holes, near the upper, free end of the arms, houses a removable spool axle pin by which a fishing line supply spool is mounted.

Below the frame, beneath the fixed arms, is a coupling means for attaching the device to a fishing rod. This may be in the form of two support arms, spaced closely together and extending downwards from the center point of the frame. These two support arms have a pair of aligned holes through them for the mounting of a screw and wing nut assembly to draw the two arms together and hold the device to the fishing rod.

The tension and guide plate is attached to the frame by the tension plate pin which allows the plate to move freely towards and away from the spool axle pin. This plate is spring loaded by the presence of two coil torsion springs segments mounted on the tension plate pin. One portion of the spring lies against the back side of the tension and guide plate, applying pressure to the plate to bias it towards the spool axle pin.

The tension and guide plate has on its face a series of grooves running vertically to compensate for the varying widths of supply spools. Once located on the spool axle, the grooves restrain the spool from lateral drift.

In use the tension plate is forced back against the resistance of the spring, and the spool axle pin is inserted through the arms of the frame and through the center of a fishing line supply spool mounted there between. Once the supply spool is mounted on the axle pin, the tension plate is allowed to relax and rest-- against- the circumferential edges of the spool. Customarily, such edges extend beyond the coiled fishing line and are circular in character.

The edges of most supply spools being used are sufficiently thin so as to fit into the grooves on the tension plate. As the spool is rotated while unwinding, the grooves will stop the supply spool from moving transversely. At the same time, the tension plate applies a consistent and proper amount of tension to the spool while the process of loading is occurring. This occurs because the spring means is chosen to apply the proper amount of tension on varying diameters of supply spools, increasing the tension as the spool size increases.

These and further features of the invention will be more apparent from the description of the preferred embodiment which now follows.

SUMMARY OF THE DRAWINGS

FIGS. 2A and 2B show the top, side and end views of the tension and guide plate, with the hole through one end for inserting a pin to act as the hinge.

FIG. 2C shows the two views of the coil torsion spring used to apply a specific amount of tension to the plate of FIG. 2A.

FIG. 2D shows the two views of the axle pin which supports the supply spool on the frame in FIG 1A.

FIG. 3 shows the invention assembled with the tension and guide plate resting against the axle pin which is in place.

FIG. 3A is an end view of FIG. 3, with a spool installed, showing engagement between the guide plate and the circumferential edges of the spool.

DESCRIPTION OF THE PREFERRED EMBODIMENTS

Figure 1A:
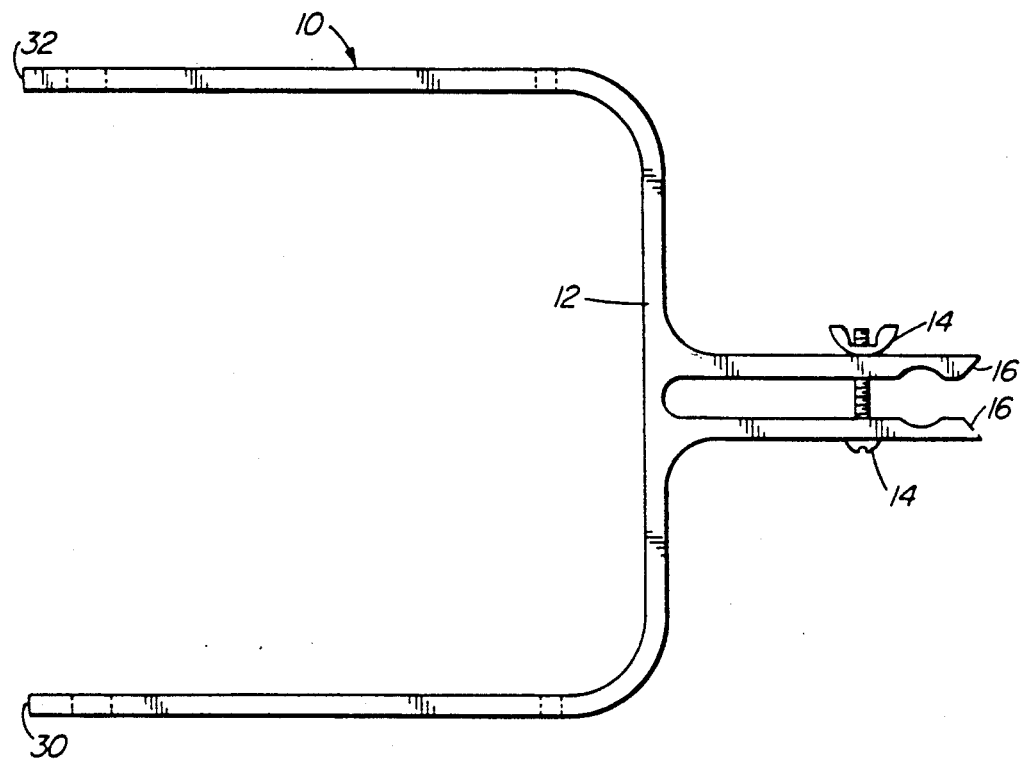
FIGS. 1A and 1B show top and side views of the main frame of the invention showing the lower mounting arms with screw and wing nut assembly in place and the two pairs of aligned holes in the arms of the fame with the axis pin and tension and guide plate removed.
Figure 1B:
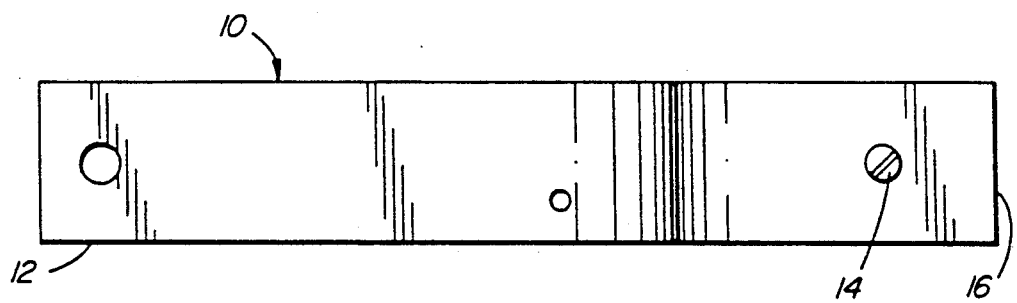
Figure 4A:
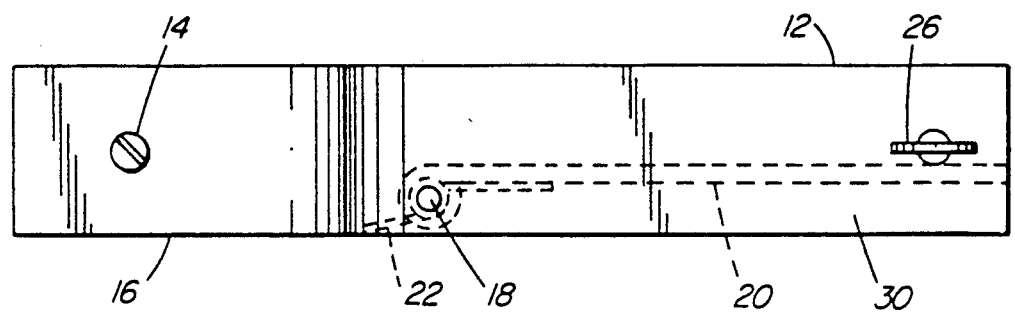
FIG. 4A shows the assembled invention in a phantom side view showing the positioning of the coil torsion springs.
Figure 4B:
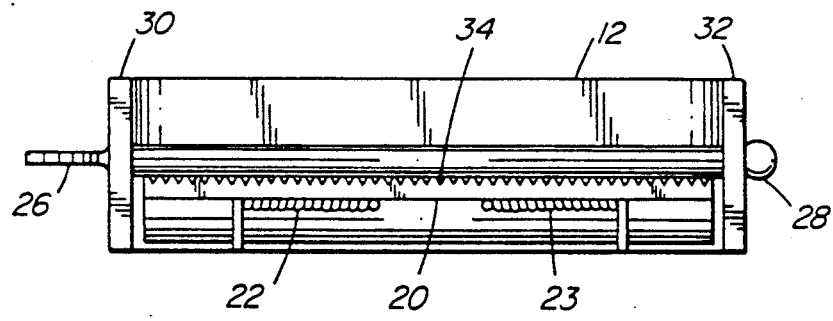
FIG. 4B shows the assembled device from a frontal view showing the top of the tension and guide plate and the grooves incorporated into its face to act as a spool guide.

Referring now to the drawings, particularly FIGS. 3 and 4, the device embodied in the present invention consists of a main frame 12 to which a screw and wing nut assembly 14 is mounted to draw the two arms 16 together and secure the device to the rod. The two arms 16 have a circular groove on the inside edge into which a fishing rod locks when the wing nut is tightened. The inside corner edge of the ends of the two arms 16 have been cut on a bevel to better enable the unit to slide over the fishing rod.

The frame 12 also has a stainless steel pin 18 which enters into the hole of one arm, closest to the base of the frame 12. Between the arms of the frame 12, the pin 18 connects a coil torsion spring 22 by travelling through its center to the tension and guide plate 20 (FIG. 2A). There it pierces the base of the tension and guide plate 20 by entering the hole at its base and exiting on the other side where it goes through the center of another coil torsion spring 23. This tension plate hinge pin then passes through the hole of the arm on the opposite side of the frame 12.

The coil torsion springs 22 and 23 are bent in such a way as to have one end fit along an edge of the frame 12 (FIG. 4A), while the other end lies flat along the tension and guide plate 20. The schedule for the spring is selected so as to apply sufficient friction to the circumferential edges 36 of the rims of a fishing spool reel to create a tension on the line of about 0.4 kilograms as the line is withdrawn.

Figure 5:
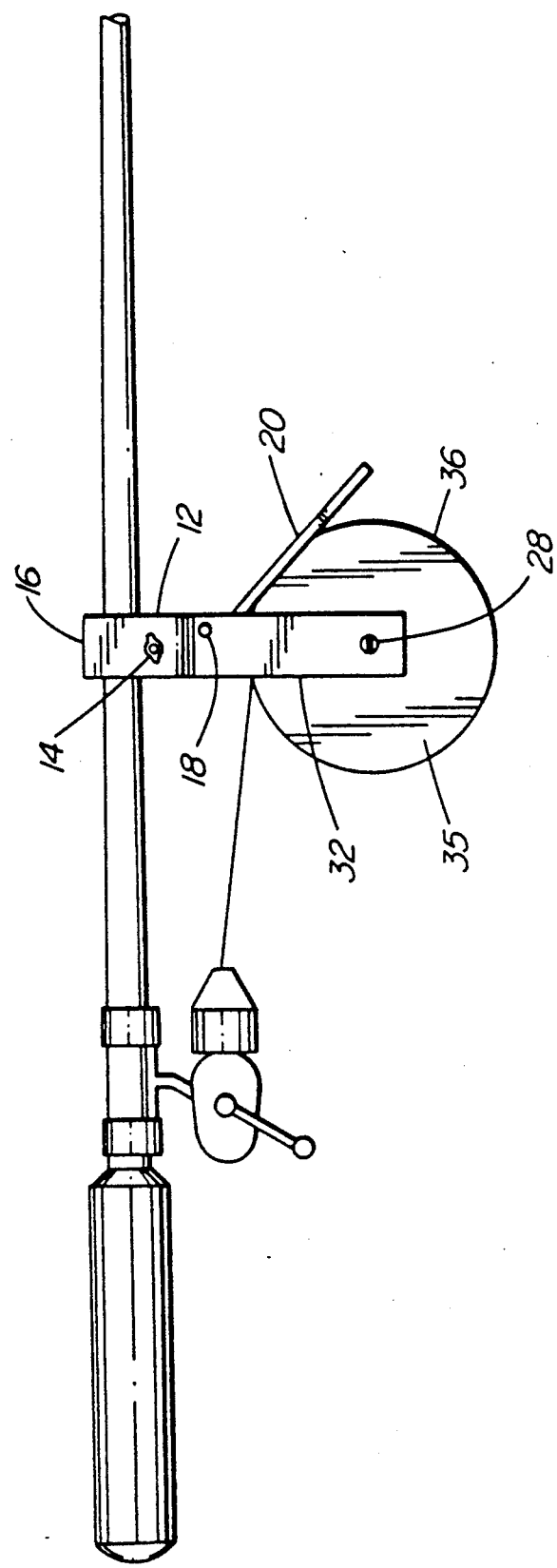
FIG. 5 shows the device in use, mounted on a fishing rod with a supply spool in place and fishing line running to the fishing reel.

An axle pin 26 is used as a mounting shaft for the spool 30, shown in FIGS. 3A and 5, being inserted through a hole in the hub of the supply spool 35 which is common to all spool sizes. The axle pin 26 has a round, flattened end for ease of holding on one end, and a split-nose design 28 on the other end, with a split running beyond the widest point of the rod 26 enabling it to collapse slightly to pass through the hole in the frame 12, FIG. 2D). This provides a convenient removable "bayonet" engagement.

When the tension and guide plate 20 is pulled down and the axle pin 26 is installed, the coil torsion springs 22 and 23 apply enough tension to the tension guide plate 20 so as to keep it against the axle pin 26 without undue movement, even if the fit on the pin is loose.

In use the unit is fitted over the fishing rod near the reel without the need of rod disassembly. The screw and wing nut assembly 14 is finger-tightened so the two descending arms 16 are drawn together and grasp the rod firmly with the unit attached to the rod, the tension and guide plate 20 is pulled back and the axle pin 26 is pulled partially out until there is enough room for the supply spool 35 to fit between the axle pin end 28 and the arms 30, 32. The supply spool 35 is then moved to the center of the frame 12, allowing the axle pin 26 to be inserted through the center hub of the supply spool 30 and reinserted into the hole of the frame arm 32.

Releasing the tension and guide plate 20 against the spool, the circumferential edges 36 of the supply spool 35 rest in the grooves 34 of the tension and guide plate 20, as shown best in FIG. 3A. These grooves 34 trap the spool 35 and hold it with enough tension via the pressure exerted by the coil torsion springs 22 and 23 on the tension and guide plate 20 to allow the fishing line to be unwound without the tendency of the supply spool 35 to travel horizontally along the axle pin 26. The friction applied limits the tendency to over-run the reel which is being loaded.

The supply spool, during this operation, transfers the fishing line to the reel by turning on the axle pin 26 while under tension by the tension and guide plate 20, unwinding the line at the same rate as the fishing reel is winding it in.

While there is shown a specific and described herein specific structures embodying the invention, it will be clear to those skilled in the art that various modifications and rearrangements of parts may be made without departing from the spirit and scope of the inventive concept and the same is not limited to the particular forms herein shown and described.

The foregoing has been set forth as an exemplary embodiment of the invention. The invention in its most general and more particular aspects is further described and defined in the claims which now follow.

The embodiments of the invention in which an exclusive property or privilege is claimed are defined as follows:

1. A fishing line loading device for supporting a spool of fishing line having a pair of outer circumferential edges for use to effect transfer of such line to a fishing reel comprising:
    (a) a frame having two support arms extending upright from a transverse base, said arms having a spool axle pin passing there between; and
    (b) a tension plate hingedly mounted between said arms about an axis proximate to said base, said plate being of a width sufficient to engage both of said circumferential edges of said spool, and being biased by spring means to move towards said spool axle pin and to bear with frictional engagement against said circumferential edges of said spool of fishing line, when such spool is installed on said spool axle pin, wherein the spring schedule of said spring means is adapted to place a predetermined tension on fishing line, carried on a variety of spool diameters, as said line is withdrawn from said spool and thereby effect the transfer of line to the reel.

2. A fishing line loading device as in claim 1 wherein said device comprises coupling means for attaching said device to a fishing rod.

3. A fishing line loading device for supporting a spool of fishing line having a pair of outer circumferential edges for use to effect transfer of such line to a fishing reel comprising:
    (a) a frame having two support arms extending upright from a transverse base, said arms having a spool axle pin passing there between; and
    (b) a tension plate hingedly mounted between said arms about an axis proximate to said base, said plate being of a width sufficient to engage both of said circumferential edges of said spool, and being biased by spring means to move towards said spool axle pin and to bear with frictional engagement against said circumferential edges of said spool of fishing line, when such spool is installed on said spool axle pin, wherein the spring schedule of said spring means is adapted to place a predetermined tension on fishing line, carried on a variety of spool diameters, as said line is withdrawn from said spool and thereby effect the transfer of line to the reel, and wherein the bearing face of said plate is provided with vertical grooves which engage with and localize the circumferential edges of said spool at a constant position between said arms while fishing line is being transferred to the fishing reel.

4. A fishing line loading device as in claim 3 wherein said device comprises coupling means for attaching said device to a fishing rod.

* * * * *